(12) United States Patent
Haar

(10) Patent No.: US 8,030,792 B2
(45) Date of Patent: Oct. 4, 2011

(54) VERTICAL AXIS WIND TURBINE SYSTEM

(75) Inventor: Jonathan Haar, Cambridge, MA (US)

(73) Assignee: Eastern Wind Power, Cambridge, MA (US)

( * ) Notice: Subject to any disclaimer, the term of this patent is extended or adjusted under 35 U.S.C. 154(b) by 394 days.

(21) Appl. No.: 12/403,001

(22) Filed: Mar. 12, 2009

(65) Prior Publication Data

US 2010/0230972 A1      Sep. 16, 2010

(51) Int. Cl.
*F03D 9/00* (2006.01)
(52) U.S. Cl. .......................................... 290/44; 290/55
(58) Field of Classification Search .................... 290/44, 290/55; 415/123; 416/203, 201 R, 201 A, 416/198 R, 41
See application file for complete search history.

(56) References Cited

U.S. PATENT DOCUMENTS

| | | | |
|---|---|---|---|
| 4,115,027 A | 9/1978 | Thomas | |
| 4,247,252 A | 1/1981 | Seki et al. | |
| 4,247,253 A | 1/1981 | Seki et al. | |
| 4,285,636 A | 8/1981 | Kato et al. | |
| 4,421,458 A | 12/1983 | Allan et al. | |
| 4,456,429 A | 6/1984 | Kelland | |
| 5,057,696 A | 10/1991 | Thomas | |
| 5,203,672 A | 4/1993 | Wolf | |
| 5,332,925 A | 7/1994 | Thomas | |
| 5,336,933 A | 8/1994 | Ernster | |
| 5,503,525 A | 4/1996 | Brown et al. | |
| 5,527,152 A | 6/1996 | Coleman et al. | |
| 6,320,273 B1 | 11/2001 | Nemec | |
| 6,784,566 B2 | 8/2004 | Thomas | |
| 6,864,594 B2 | 3/2005 | Seki | |
| 6,974,309 B2 | 12/2005 | Seki | |
| 7,109,599 B2 | 9/2006 | Watkins | |
| 7,352,076 B1 | 4/2008 | Gabrys | |
| 7,425,776 B2 * | 9/2008 | Ketcham | 290/55 |
| 7,849,596 B2 | 12/2010 | Sauer et al. | |
| 7,948,110 B2 * | 5/2011 | Morgan et al. | 290/55 |
| 2002/0105190 A1 | 8/2002 | Thomas | |
| 2004/0041405 A1 | 3/2004 | Seki | |
| 2004/0170501 A1 | 9/2004 | Seki | |
| 2007/0177970 A1 | 8/2007 | Yokoi | |
| 2007/0231139 A1 | 10/2007 | Yokoi | |
| 2008/0159873 A1 | 7/2008 | Tran | |
| 2008/0191487 A1 | 8/2008 | Morgan et al. | |

(Continued)

FOREIGN PATENT DOCUMENTS

GB      2008202      5/1979

(Continued)

OTHER PUBLICATIONS

Small Wind Certification Council, Small Wind Turbine Certification Policy, Clifton Park, NY, May 2010, pp. 1-27.

(Continued)

*Primary Examiner* — Tho D Ta
(74) *Attorney, Agent, or Firm* — Hovey Williams LLP

(57) ABSTRACT

Wind turbine system. The system includes a lower wind speed vertical axis wind turbine operatively connected to a first electrical motor/generator and a higher wind speed vertical axis wind turbine operatively connected to at least one second electrical motor/generator. Electrical power from the first electrical motor/generator is directed to the at least one second electrical motor/generator and mag-lev system to cause the higher wind speed turbine to begin turning.

14 Claims, 3 Drawing Sheets

U.S. PATENT DOCUMENTS

| | | | |
|---|---|---|---|
| 2008/0213083 A1 | 9/2008 | Unno | |
| 2008/0256795 A1 | 10/2008 | Edwards | |
| 2008/0273978 A1 | 11/2008 | Watkins | |
| 2008/0309090 A1 | 12/2008 | Stern et al. | |
| 2009/0097981 A1 | 4/2009 | Gabrys | |
| 2009/0167030 A1 | 7/2009 | Watkins | |
| 2010/0133829 A1 | 6/2010 | Bertenyi | |
| 2010/0181958 A1* | 7/2010 | Caudill | 320/101 |
| 2010/0259046 A1 | 10/2010 | Kota et al. | |
| 2011/0006543 A1 | 1/2011 | Hu | |

FOREIGN PATENT DOCUMENTS

| | | |
|---|---|---|
| WO | 9213192 | 8/1992 |
| WO | 03058059 | 7/2003 |
| WO | 03064852 | 8/2003 |
| WO | 2005010355 | 2/2005 |
| WO | 2005085633 | 9/2005 |
| WO | 2006119922 | 11/2006 |
| WO | 2007012195 | 2/2007 |
| WO | 2007021992 | 2/2007 |
| WO | 2008077199 | 7/2008 |
| WO | 2008100580 | 8/2008 |
| WO | 2008119994 | 10/2008 |
| WO | 2008141763 | 11/2008 |
| WO | 2008141813 | 11/2008 |
| WO | 2009075853 | 6/2009 |
| WO | 2009075872 | 6/2009 |

OTHER PUBLICATIONS

International Standard, Wind turbines—Part 2: Design requirements for small wind turbines, IEC, Geneva, Switzerland, Second Edition, Reference No. IEC 61400-2:2006(E), pp. 1-181.

Abbott et al., National Advisory Committee for Aeronautics, Report No. 824, Summary of Airfoil Data, 1945, pp. 1-265.

Sheldahl et al., "Aerodynamic Characteristics of Seven Symmetrical Airfoil Sections Through 180-Degree Angle of Attack for Use in Aerodynamic Analysis of Vertical Axis Wind Turbines," Sandia National Laboratories Energy Report, Mar. 1981, pp. 1-120.

Strickland, "The Darrieus Turbine: A Performance Prediction Model Using Multiple Streamtubes," Sandia Laboratories Energy Report, Oct. 1975, pp. 1-36.

Cochran et al., "Integrating Wind Energy into the Design of Tall Buildings—A Case Study of the Houston Discovery Tower: Harvesting Wind Power from Tall Buildings," 2008, pp. 1-11.

* cited by examiner

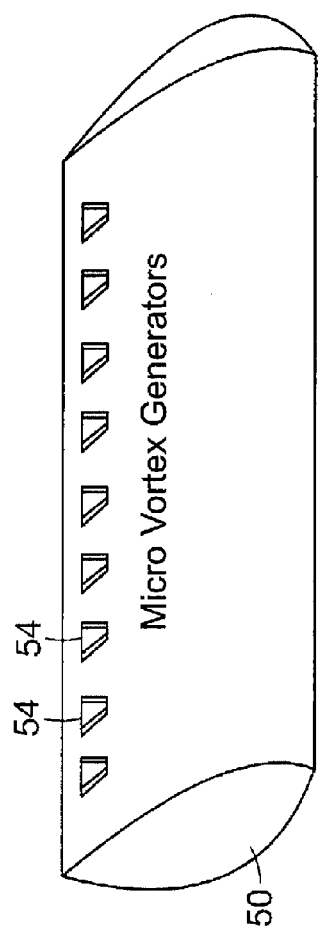
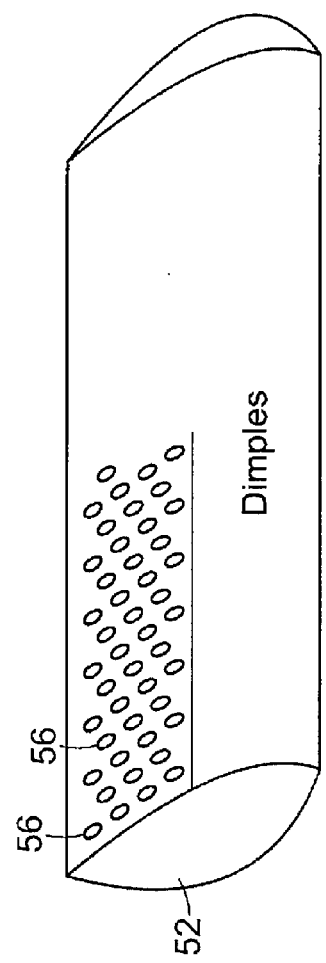
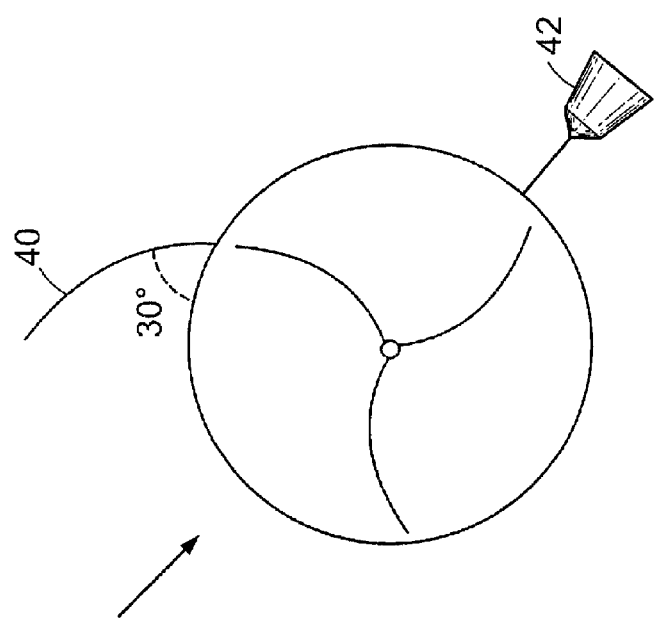

US 8,030,792 B2

VERTICAL AXIS WIND TURBINE SYSTEM

BACKGROUND OF THE INVENTION

This invention relates to a wind turbine system and more particularly to a composite vertical axis wind turbine system that utilizes a lower wind speed vertical axis wind turbine to start the rotation of a higher wind speed wind turbine.

Wind energy is rapidly emerging as one of the most cost-effective forms of renewable energy with an ever-increasing installed capacity around the world. One of the widely recognized types of turbines used for electricity generation is the well-recognized Horizontal Axis Wind Turbine (HAWT). This type of turbine features a high blade tip velocity ratio, relatively high power generation efficiency, and low start-up torque. The second major group of wind turbines is the Vertical Axis Wind Turbines (VAWT), which possess several inherent advantages over HAWTs: VAWTs do not have to be yaw-adjusted to follow the changing direction of prevailing wind, and consequently handle gusts more efficiently; the power generator can be integrated into the system at ground level, reducing the structural requirements of the support tower, are much quieter in operation, lower in vibration and bird-friendly. However, a major disadvantage of most VAWT configurations is that they require a relatively high start-up torque. An omnidirectional vertical wind turbine electric generator system has been disclosed in U.S. Pat. No. 7,109,599 to Watkins. The contents of this patent are incorporated herein by reference.

Because of typical blade configurations and mechanical stiction in vertical axis wind turbines, it is known that starting a vertical axis wind turbine requires a higher wind speed than is necessary to keep the turbine rotating once it is in motion. Relatively smaller vertical axis wind turbines will start at lower wind speeds such as, for example, 3 miles per hour, whereas larger-sized units would require a higher wind speed (say 8 miles per hour) to start but might continue to rotate, once having been started, at, for example, 5 miles per hour.

It is an object of the present invention to address this major deficiency of VAWT by proposing a double-vertical-axis-turbine system with a torque-amplifying cascade arrangement. This system features a small vertical axis turbine that starts at a relatively lower wind speed which, once up to speed, subsequently starts a relatively higher wind speed vertical axis wind turbine.

SUMMARY OF THE INVENTION

In one aspect, the wind turbine system according to the invention includes a lower wind speed vertical axis turbine operatively connected to a first electrical motor/generator. A higher wind speed vertical axis wind turbine is provided and is operatively connected to at least one second electrical motor/generator. Electrical power from the first electrical motor/generator is directed to at least one second electrical motor/generator to start the higher wind speed turbine. In a preferred embodiment, the lower wind speed vertical axis wind turbine is disposed on top of the higher wind speed vertical axis wind turbine. It is preferred that the higher wind speed vertical axis wind turbine be operatively connected to two second electrical motor/generators.

In another preferred embodiment, the system includes an anemometer to measure wind speed such that the output of the anemometer is operatively connected to the first electrical motor/generator to direct power to the at least one second electrical motor/generator when measured wind speed reaches a selected level. Power electronics are provided to distribute electrical power from the first and second electrical motor/generators.

In one embodiment, the lower wind speed turbine includes five blades and the higher wind speed turbine includes three blades. It is preferred that the lower wind speed turbine be designed to begin rotating at a wind speed of approximately 3 miles per hour. A suitable higher wind speed turbine is designed to "self-start" turning at a wind speed of 8 miles per hour but once started, can run at say 5 miles per hour.

The wind turbine system disclosed herein is designed for mounting on building rooftops although other locations are appropriate. It is preferred that the turbines be selected to provide power in the range of 10 kW to 30 kW. The lower wind speed turbine and the higher wind speed turbine may share a common shaft. The blades of the turbines may be conventional wings with a high performance cambered airfoil configuration, featuring high lift-to-drag ratios. The blades may include regions with different surface textures and treatments.

An auxiliary blade that deploys at an angle to the main blades by use of a passive tail to serve as a wind directing and accelerating scoop blade that can swerve at an angle of say 30° to 40° off the prevailing wind may be provided, as in a sailboat's jib changing the mainsails' apparent wind and increasing the surface area of the overall "sail" area.

BRIEF DESCRIPTION OF THE DRAWING

FIG. 4 is a schematic illustration (plan view) of an auxiliary accelerator blade according to another embodiment of the invention.

FIGS. 5a and 5b are perspective views of turbine blades showing surface treatments including micro vortex generators and dimples to cause the wind to be "stickier" on portions of the blade closer to the center of the hub to equalize and maximize pressure on the blade surface.

DESCRIPTION OF THE PREFERRED EMBODIMENT

Figure 1:
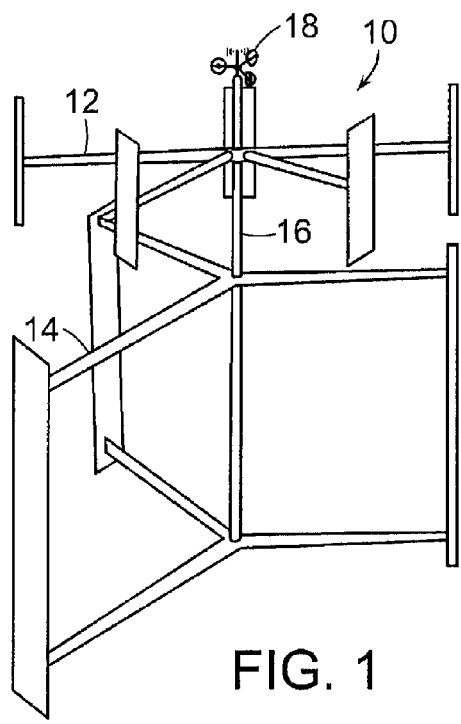
FIG. 1 is a perspective, schematic view of an embodiment of the invention disclosed herein.

As shown schematically in FIG. 1, the wind turbine system 10 includes a lower wind speed vertical axis wind turbine 12 mounted above a higher wind speed vertical axis wind turbine 14. An anemometer 18 is mounted on the lower wind speed vertical axis turbine 12 brace system, out of the way of the turbine's exhaust flow.

Figure 2:
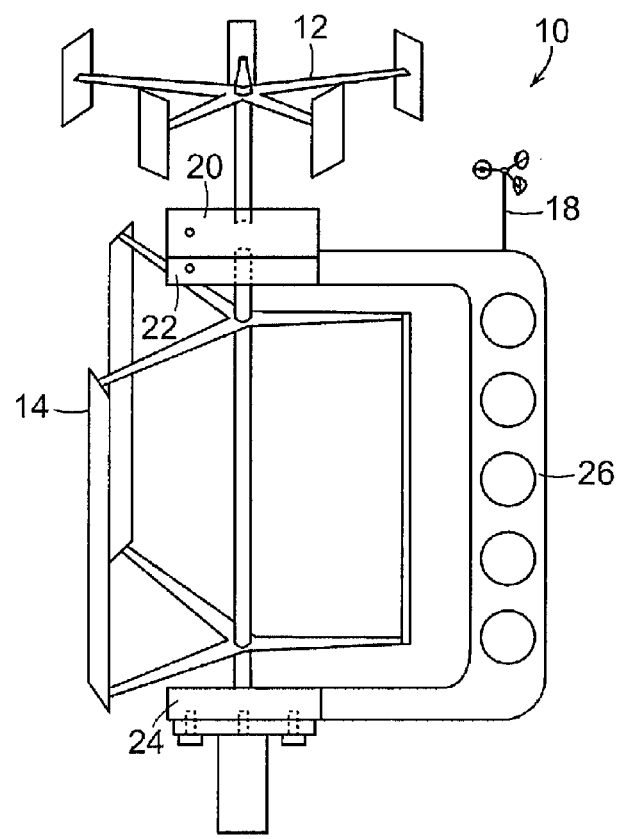
FIG. 2 is a perspective view of another embodiment of the invention.
Figure 3:
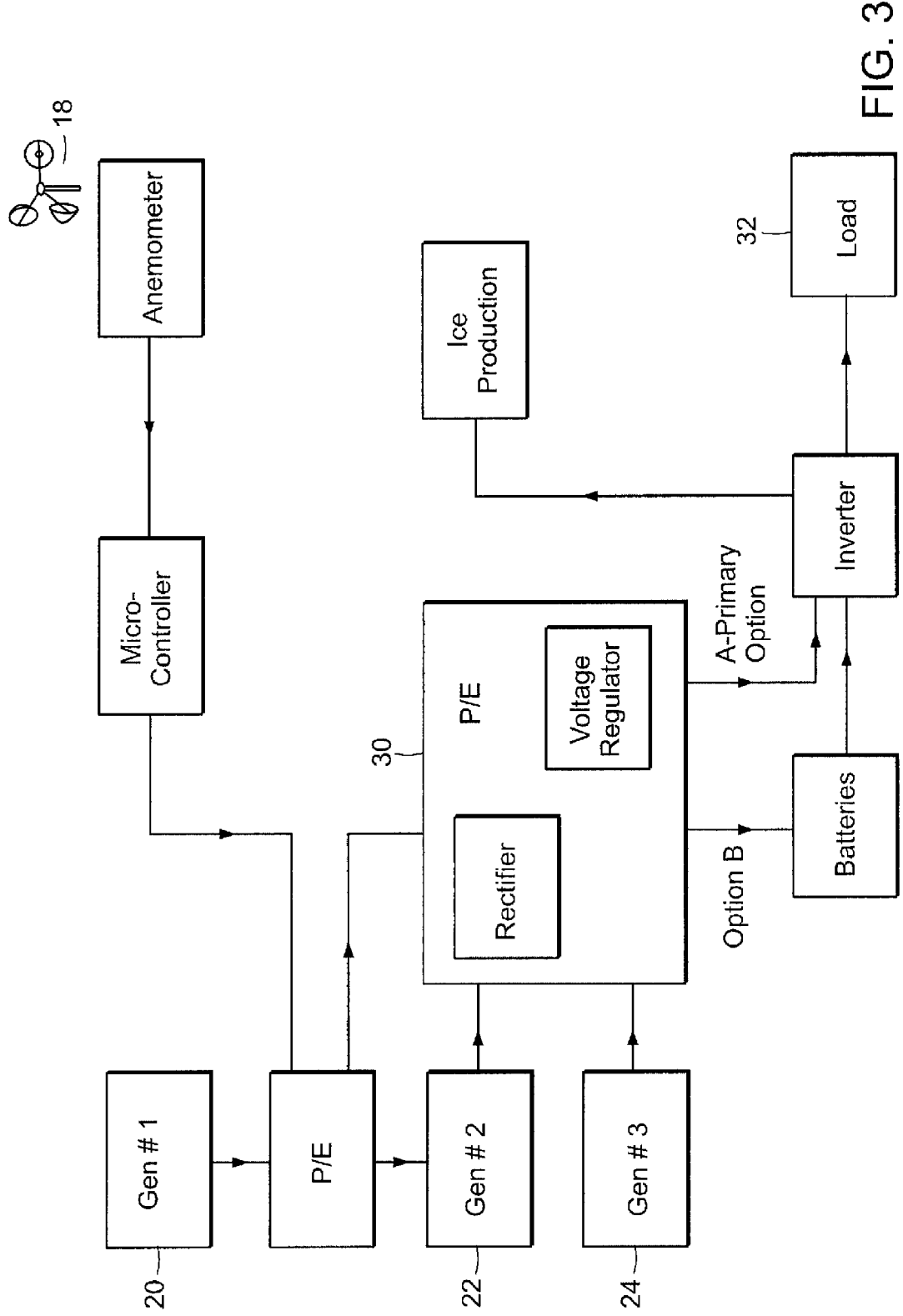
FIG. 3 is a block diagram showing the power electronics arrangement.

An embodiment of the invention is shown in greater detail in FIG. 2. The lower wind speed turbine 12 includes five blades but it should be understood that more or fewer than five blades may be utilized. The lower wind speed turbine 12 is operatively connected to a motor/generator 20. The turbine 12 sits above a relatively higher wind speed turbine 14 that is operatively connected to a generator 22. The higher wind speed turbine 14 is also operatively connected to another generator 24. In this embodiment, the wind turbines 12 and 14 are supported on a brace 26 that also supports the anemometer 18. As shown in FIG. 3, the output of the motor/generators 20, 22 and 24 are delivered to the power electronics (P/E) module 30 and ultimately to a load 32 that may be the electrical grid or an on-site storage system for either local use or as a power reservoir to be either a back-up system or for use at peak demand/peak utility pricing.

The five bladed lower wind speed vertical axis wind turbine 12 is designed to start in light winds of, for example, approximately 3 miles per hour and begin producing usable power at, say 5 MPH, producing 40% of generator's 20 rated capacity. The larger, higher wind speed vertical axis turbine 14 requires a higher start-up torque to operate. For example, the higher wind speed turbine 14 may not start in winds lighter than 8 miles per hour, but once rotating, it can sustain rotation at a lower speed such as 5 miles per hour. Suitable light wind vertical axis wind turbines are available from PacWind, Inc. of Torrance, Calif. See, U.S. Pat. No. 7,109,599 mentioned above.

Therefore under this scenario, when the anemometer 18 detects a 5 mile per hour wind speed, electrical energy from the generator 20 (since the lower wind speed turbine 12 is already rotating) is directed to the motor/generator 22 which subsequently starts the turbine 14. Once the higher wind speed vertical axis turbine 14 is sustainably rotating, electrical energy from both the generator 20 and the generator 22 is distributed to the load 32.

An aid to start-up and braking in an "over-speed" condition may be a pair of Neodymium magnets (not shown) mounted on the turbine 14's input and on generator 24's output shaft with generator 24's magnet wrapped with one or more copper coils connected to the P/E circuit 30. The Neodymium magnets are positioned to lift turbine 14 off generator 24's bearings a few centimeters to reduce the start-up stiction and bearing wear. In an "over-speed" event, the excess current of generator 24 can be switched through the P/E controls to charge the coils wrapping the magnet on generator 24 thereby reversing the magnet's polarity and acting as an "electric brake" on turbine 14 output shaft until a transient gust has passed, as determined by the anemometer 18. Anemometer 18 may also "chop" generators 20 and 24's variable voltage output being sent to the P/E to not exceed acceptable voltage. The same system will be applied on a smaller scale to turbine 12's blades to control its peak torque output.

In effect, the smaller turbine 12 and its motor/generator 20 act as a starter motor for the larger, higher wind speed turbine 14, with the added assistance of the Neodymium magnet system. More importantly, an additional generator 24 is also operatively connected to the higher wind speed turbine 14. In higher winds or during gusts, the power electronics 30 will engage the third generator 24 at the bottom of the larger unit 14, creating a third level of counteracting torque against which the turbine blades will engage. This arrangement will thereby serve as both another source of electrical production and, in effect, another electronic "brake" on the turbines' shaft and therefore on the blades' rotational speed. In an "over-speed" event, the excess current of generator 24 can be switched through the P/E controls to charge the coils wrapping the magnet on 24 thereby reversing the magnet's polarity. This change of polarity acts as an "electric brake" on blade 14's output shaft until the transient gust has passed or as a means to lock down the turbine, as determined by anemometer 18.

There are thus three possible load set points (blades of turbines 12 and 14 are scaled to match to local environmental conditions) created by the sizing and choice of the three generators 20, 22 and 24. The three generators effectively create an electronic transmission with three gears sized to: 1) light wind; 2) start up to average geographic wind speed; and 3) maximum wind speed. These three generators 20, 22 and 24 are all direct drive units sitting on/under the output shaft, eliminating any output loss that would accompany the use of belts, gears and clutches in conventional transmissions.

By using three smaller generators rather than one large generator, the usable power output will start at lower speeds; stay on the power profile of generators found on the market (which have narrow/high rpm power bands for effective conversion to and from mechanical to electrical power); and, be able to produce power in gales and high winds which would cause conventional units either to clip their power output, veer out of the wind, break their unit, or just have to shut down.

The blades on the turbines 12 and 14 may be conventional wings or more advanced high lift-to-drag ratio cambered airfoil blades. The tips and connection points of the blades may receive a shape treatment to assist in energy production and lift generation, and the center shaft may be shaped to allow wind flow to pass with minimal disturbance, as would the support structure, brace 26, which may be composed of one or more supports.

If the turbine system of the invention were to be used in, for example, Boston, Mass., the smaller turbine 12 would likely kick in at approximately 3 miles per hour and produce enough power/torque to move the larger bladed unit 14 at a wind speed of 5 miles per hour. At this point, the motor/generator 22 will come on-line and will max out at approximately 13 miles per hour, the average regional wind speed, and continue to generate its maximum voltage/output throughout the generator 24 start and run-up to 29 miles per hour or greater. Above this wind speed, both generators 22 and 24 would likely have their output clipped and maintained at a constant level so as not to damage the power electronics. It should be noted that the three generators 20, 22 and 24 may be coupled mechanically on two shafts, one for the light wind generator and one for the larger turbine, coupled with a clutch between a small output shaft and the larger turbine's shaft, or preferably electrically controlled through the power electronics resulting in a much higher output and broader power band at lower wind speeds than a conventional unit. It is preferred that the units be electrically coupled because a clutch system is both more expensive to manufacture and requires constant monitoring and maintenance and potential failure, leading to catastrophic unit failure.

With reference now to FIG. 4 either one or both of the turbines 12 or 14 may include an auxiliary accelerator blade or airfoil 40 that can swerve into a pre-set angle to the prevailing wind (say 30° to 40° off the wind) by the counter action of an orienting tail 42.

As shown in FIGS. 5a and 5b, blades 50 and 52 or regions/sections thereof, may contain micro vortex generators 54 or dimples 56 to result in greater extraction of energy from the prevailing wind.

It is recognized that modifications and variations of the present invention will be apparent to those of ordinary skill in the art and it is intended that all such modifications and variations be included within the scope of the appended claims.

What is claimed is:
1. Wind turbine system comprising:
  a lower wind speed vertical axis wind turbine operatively connected to a first electrical motor/generator;
  a higher wind speed vertical axis wind turbine operatively connected to at least one second electrical motor/generator, wherein electrical power from the first electrical motor/generator is directed to the at least one second electrical motor/generator to cause the higher wind speed vertical axis wind turbine to begin turning; and
  power electronics to distribute electrical power from the first and second electrical motor/generators.

2. The system of claim 1 wherein the lower wind speed vertical wind turbine is disposed above the higher wind speed vertical axis wind turbine.

3. The system of claim 1 including two second electrical motor/generators operatively connected to the higher wind speed vertical axis wind turbine.

4. The system of claim 1 further including an anemometer to measure wind speed, the output of the anemometer operatively connected to the first electrical motor/generator to direct power to the at least one second electrical motor/generator when measured wind speed reaches a pre-set level.

5. The system of claim 1 wherein the lower wind speed turbine includes five blades and the higher wind speed turbine includes three blades.

6. The system of claim 1 wherein the lower wind speed turbine is designed to begin rotating at a wind speed of approximately 3 miles per hour.

7. The system of claim 1 wherein the higher wind speed turbine is designed to start at a wind speed of approximately 8 miles per hour, but may be started at 5 miles per hour with current provided by the low speed turbine and to begin generating power once sustainable turbine rotation is established.

8. The system of claim 1 wherein the vertical axis wind turbines are designed for mounting on building rooftops.

9. The system of claim 1 wherein the turbines are selected to provide power in the range of 10 kW to 30 kW.

10. The system of claim 1 further including at least one auxiliary blade that deploys at an angle to the other blades.

11. The system of claim 1 further including magnetic means for lifting a turbine to eliminate stiction and serve a dual purpose as an electrical braking system.

12. The system of claim 1 wherein the turbines include blades that are conventional wings or modern high lift-to-drag ratio airfoils.

13. The system of claim 12 wherein the blades include regions with different surface textures.

14. The system of claim 13 wherein the surface textures include micro vortex generators or dimples.

* * * * *